(12) United States Patent
Visnoski

(10) Patent No.: US 11,498,170 B2
(45) Date of Patent: Nov. 15, 2022

(54) SURFACE AREA OF FIXTURES

(71) Applicant: The Boeing Company, Chicago, IL (US)

(72) Inventor: Bryan J. Visnoski, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 135 days.

(21) Appl. No.: 16/989,580

(22) Filed: Aug. 10, 2020

(65) Prior Publication Data

US 2020/0368863 A1 Nov. 26, 2020

Related U.S. Application Data

(62) Division of application No. 14/711,021, filed on May 13, 2015, now Pat. No. 10,744,607.

(51) Int. Cl.
| | |
|---|---|
| *B23Q 3/08* | (2006.01) |
| *B23C 9/00* | (2006.01) |
| *B23Q 3/06* | (2006.01) |
| *B64F 5/10* | (2017.01) |
| *B25B 11/00* | (2006.01) |
| *B23B 35/00* | (2006.01) |
| *B23B 47/28* | (2006.01) |

(52) U.S. Cl.
CPC ............... *B23Q 3/088* (2013.01); *B23C 9/00* (2013.01); *B23Q 3/062* (2013.01); *B25B 11/005* (2013.01); *B64F 5/10* (2017.01); *B23B 35/00* (2013.01); *B23B 47/287* (2013.01); *B23B 2215/04* (2013.01); *B23C 2270/08* (2013.01); *Y10T 29/49998* (2015.01); *Y10T 408/50* (2015.01)

(58) Field of Classification Search
CPC .... B25B 11/005; B64F 5/10; Y10T 29/49998; Y10T 408/03; Y10T 408/50; B23B 2215/04; B23B 35/00; B23B 47/287; B23Q 3/088; B23Q 1/035; B23Q 3/062; B23C 9/00; B23C 2270/08
USPC ........................................... 269/21
See application file for complete search history.

(56) References Cited

U.S. PATENT DOCUMENTS

| | | |
|---|---|---|
| 2,417,539 A | 3/1947 | Aronson |
| 2,622,821 A | 12/1952 | Powell |

(Continued)

FOREIGN PATENT DOCUMENTS

| | | | |
|---|---|---|---|
| FR | 2622821 A1 | 5/1989 | |
| JP | 2003340787 A | 12/2003 | |

(Continued)

OTHER PUBLICATIONS

Dal Santo et al., "Cold forming oby stretching of aeronautic sheet metal parts," International Journal of Computer Integrated, Sibmitted Sep. 11, 2014, 27 (2), pp. 129-138.

(Continued)

*Primary Examiner* — Mahdi H Nejad
(74) *Attorney, Agent, or Firm* — Yee & Associates, P.C.

(57) ABSTRACT

A method and apparatus. The apparatus comprises a first portion of a tool and a second portion of the tool. The first portion of the tool has a first surface. The first surface has a shape that is complementary to a first portion of a part. The second portion has at least one of a second surface configured to be recessed from a second portion of the part or a hollow portion.

17 Claims, 9 Drawing Sheets

(56) References Cited

U.S. PATENT DOCUMENTS

| | | |
|---|---|---|
| 2,946,246 A | 7/1960 | Allan |
| 3,294,392 A | 12/1966 | Dunham |
| 3,355,078 A | 11/1967 | Smith |
| 3,834,687 A | 9/1974 | Martin et al. |
| 4,006,909 A | 2/1977 | Ollendorf et al. |
| 4,981,345 A | 1/1991 | Berry et al. |
| 5,173,016 A | 12/1992 | Ellison et al. |
| 5,409,334 A | 4/1995 | Edis et al. |
| 5,507,605 A | 4/1996 | Bae |
| 5,560,102 A | 10/1996 | Micale et al. |
| 5,630,682 A | 5/1997 | Davey |
| 5,634,749 A | 6/1997 | Edis et al. |
| 5,647,702 A | 7/1997 | Towers et al. |
| 6,176,652 B1 | 1/2001 | Tsai et al. |
| 6,413,022 B1 | 7/2002 | Sarh |
| 6,672,576 B1 | 1/2004 | Walker |
| 7,241,125 B2 | 7/2007 | Dubey et al. |
| 8,006,968 B2 | 8/2011 | Freeland |
| 8,757,937 B1 | 6/2014 | Inman et al. |
| 9,651,192 B2 | 5/2017 | McCallum et al. |
| 9,656,359 B1 | 5/2017 | Liu et al. |
| 9,703,120 B2 | 7/2017 | Pugh et al. |
| 9,757,911 B2 | 9/2017 | Riall et al. |
| 10,035,230 B2 | 7/2018 | Buckus et al. |
| 10,744,607 B2* | 8/2020 | Visnoski ............... B64F 5/10 |
| 2004/0217523 A1 | 11/2004 | Benninger |
| 2006/0261533 A1 | 11/2006 | Freeland |
| 2007/0001328 A1 | 1/2007 | Kelly |
| 2007/0138670 A1 | 6/2007 | Beebe et al. |
| 2008/0003071 A1 | 1/2008 | Yang |
| 2011/0062607 A1 | 3/2011 | Clements et al. |
| 2011/0135411 A1* | 6/2011 | Inman ............... B23Q 11/0046 408/67 |
| 2011/0243676 A1 | 10/2011 | Marguet et al. |
| 2014/0109365 A1 | 4/2014 | Sutton et al. |
| 2014/0252710 A1 | 9/2014 | Cuvalci et al. |
| 2014/0371560 A1 | 12/2014 | Etzkorn et al. |
| 2015/0190896 A1 | 7/2015 | Tanaka |
| 2015/0217420 A1 | 8/2015 | Mandler |
| 2016/0339529 A1 | 11/2016 | Stavig et al. |
| 2016/0339551 A1 | 11/2016 | Morihara et al. |
| 2017/0001734 A1 | 1/2017 | Darras et al. |
| 2018/0065166 A1 | 3/2018 | Lam et al. |
| 2018/0087382 A1 | 3/2018 | Heinrich et al. |
| 2018/0236638 A1* | 8/2018 | Olberg ............... B25H 1/00 |
| 2019/0144134 A1* | 5/2019 | Kasahara ............ B21J 15/42 29/559 |

FOREIGN PATENT DOCUMENTS

| | | | |
|---|---|---|---|
| JP | 2006312567 A | | 11/2006 |
| JP | 2007083392 A | | 4/2007 |
| JP | 2009119546 A | | 6/2009 |
| JP | 2012213836 A | * | 11/2012 |
| JP | 2012213836 A | | 11/2012 |
| JP | 2013010180 A | | 1/2013 |

OTHER PUBLICATIONS

Office Action, dated Oct. 20, 2017, regarding U.S. Appl. No. 14/711,021, 24 pages.

Final Office Action, dated May 25, 2018, regarding U.S. Appl. No. 14/711,021, 23 pages.

Office Action, dated Sep. 28, 2018, regarding U.S. Appl. No. 14/711,021, 23 pages.

Office Action, dated Sep. 23, 2019, regarding U.S. Appl. No. 14/711,021, 16 pages.

Final Office Action, dated Apr. 19, 2019, regarding U.S. Appl. No. 14/711,021, 16 pages.

Notice of Allowance, dated Mar. 23, 2020, regarding U.S. Appl. No. 14/711,021, 12 pages.

* cited by examiner

SURFACE AREA OF FIXTURES

CROSS-REFERENCE TO RELATED APPLICATION(S)

This application is a divisional application of, and claims priority to, U.S. patent application Ser. No. 14/711,021, filed May 13, 2015, and issued a Notice of Allowance dated Mar. 23, 2020. The contents of U.S. patent application Ser. No. 14/711,021 are therefore incorporated herein in their entirety.

BACKGROUND INFORMATION

1. Field

The present disclosure relates generally to the surface area of fixtures. More particularly, the present disclosure relates to milling fixtures. The present disclosure relates still more particularly to methods and apparatuses for milling fixtures with reduced surface area contact with a part.

2. Background

To perform milling operations on a part, the part may first be fitted and secured to a milling fixture. The milling fixture may provide support to the part during the milling operations. A conventional milling fixture has a surface area that is complementary to a surface of the part. As a result, during milling operations, the surface of the part may contact all of the surface area of the milling fixture.

For substantially large parts, it may be more difficult than desired to cause the surface of the part to completely contact the surface area of the milling fixture. Further, placing the surface of the part into complete contact with the surface area of the milling fixture may require at least one of an undesirable amount of time, a force, or a number of operators. In some cases, placing the surface of the part into complete contact with the surface area of the milling fixture may cause inconsistencies in the part due to undesirable forces placed upon the part. For example, for large parts, operators may stand or sit on the parts to place the surface of the parts into contact with the surface area of the milling fixture. Standing or sitting on the parts may cause out of tolerance conditions or inconsistencies in the parts.

Therefore, it would be desirable to have a method and apparatus that take into account at least some of the issues discussed above, as well as other possible issues.

SUMMARY

An illustrative embodiment of the present disclosure provides an apparatus. The apparatus comprises a first portion of a tool and a second portion of the tool. The first portion of the tool has a first surface. The first surface has a shape that is complementary to a first portion of a part. The second portion has at least one of a second surface configured to be recessed from a second portion of the part or a hollow portion.

Another illustrative embodiment of the present disclosure provides an apparatus. The apparatus comprises a part support surface of a tool, a recessed surface of the tool, and a number of vacuum ports disposed within the part support surface.

A further illustrative embodiment of the present disclosure provides a milling fixture. The milling fixture comprises a surface configured to support a part during a milling operation. The surface differs from a forming surface of a forming fixture by at least one of a recessed portion or a hollow portion.

A yet further illustrative embodiment of the present disclosure provides a method of creating a milling fixture. A first surface of a tool is manufactured. The first surface has a shape that is complementary to a first portion of a part. A second surface of the tool is manufactured. The second surface is configured to be recessed from a second portion of the part.

Another illustrative embodiment of the present disclosure provides a method of performing a milling operation. A part is placed onto a tool such that a first portion of the part contacts a first surface of the tool and a second portion of the part does not contact a second portion of the tool. The first surface has a shape that is complementary to the first portion of the part. The second portion of the tool has at least one of a second surface configured to be recessed from the second portion of the part or a hollow portion. The first portion of the part is held against the first surface of the tool. A number of milling operations are performed on the part.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account a number of different considerations. As used herein, "a number of items" means one or more items. For example, "a number of different considerations" means one or more considerations.

The illustrative embodiments recognize and take into account that conventional milling fixtures have surfaces that are complementary to a respective part. The illustrative embodiments recognize and take into account that the entirety of a surface of a conventional milling fixture may contact the part during a milling operation. The illustrative embodiments further recognize and take into account that at least one of less time, less force, or fewer operators may be used to place a part onto a milling fixture when a reduced surface area of the part contacts the part. By reducing the surface area of the part, placing the part onto the milling fixture may take at least one of less time, less force, or less operators. The illustrative embodiments also recognize and take into account that having a milling fixture with reduced surface area contacting the part may result in fewer inconsistencies in the part.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

Figure 1:
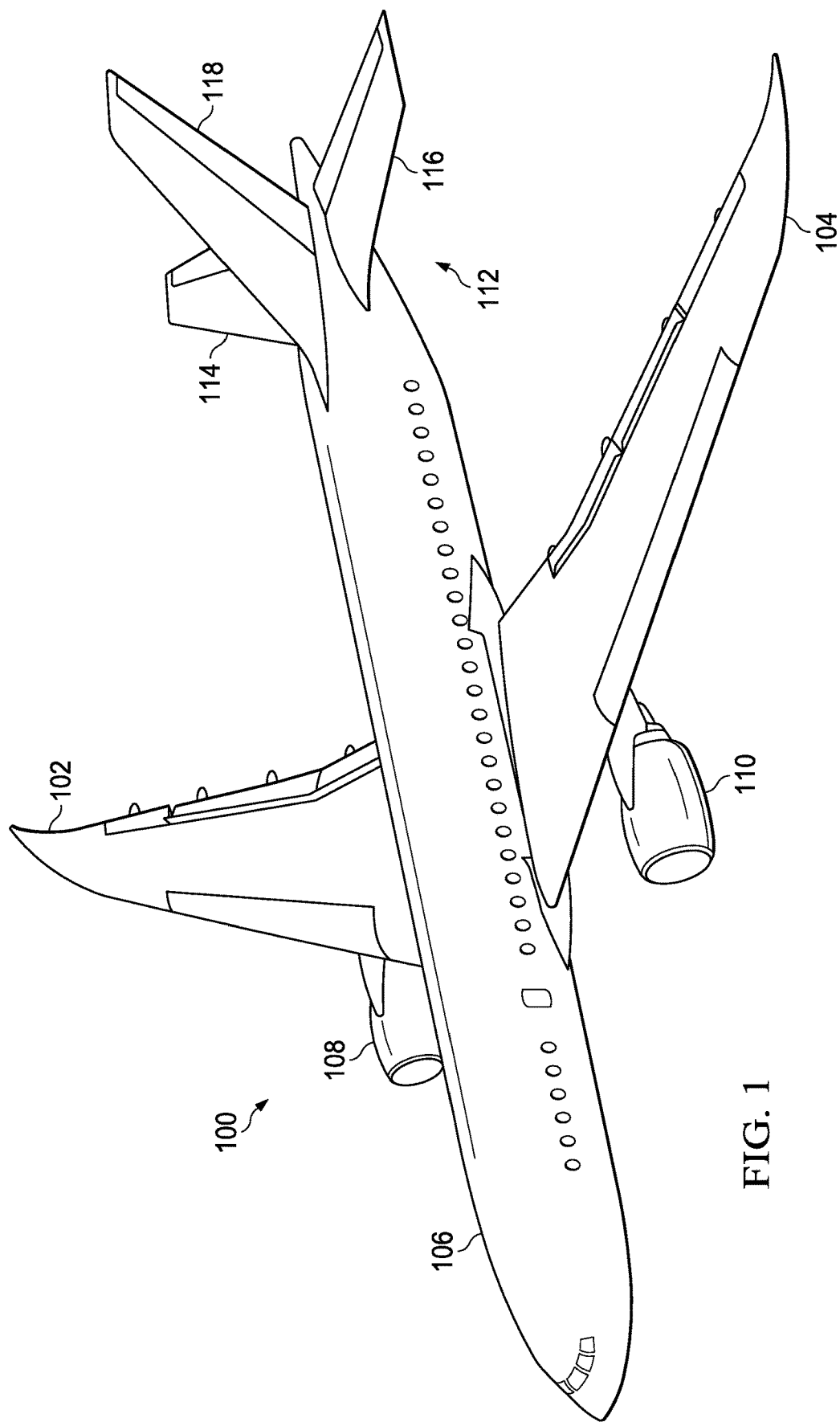
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having components which may be manufactured in accordance with an illustrative embodiment. For example, body 106 of aircraft 100 may have a passenger cabin that includes components processed using milling fixtures. As one example, portions of body 106 may be processed using milling fixtures. As another example, portions of wing 102 or wing 104 may be processed using milling fixtures.

Figure 11:
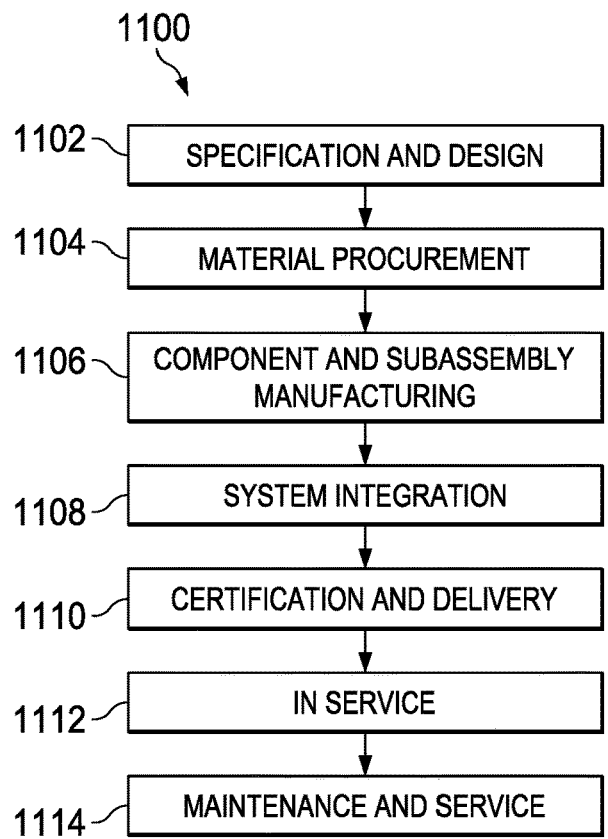
FIG. 11 is an illustration of a block diagram of an aircraft manufacturing and service method in accordance with an illustrative embodiment.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a military aircraft, a rotorcraft, and other suitable types of aircraft. For example, an illustration of a block diagram of aircraft 1100 is depicted in FIG. 11.

Although the illustrative examples for an illustrative embodiment are described with respect to an aircraft, the illustrative embodiment may be applied to other types of platforms. The platform may be, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, and other suitable platforms.)

Figure 2:
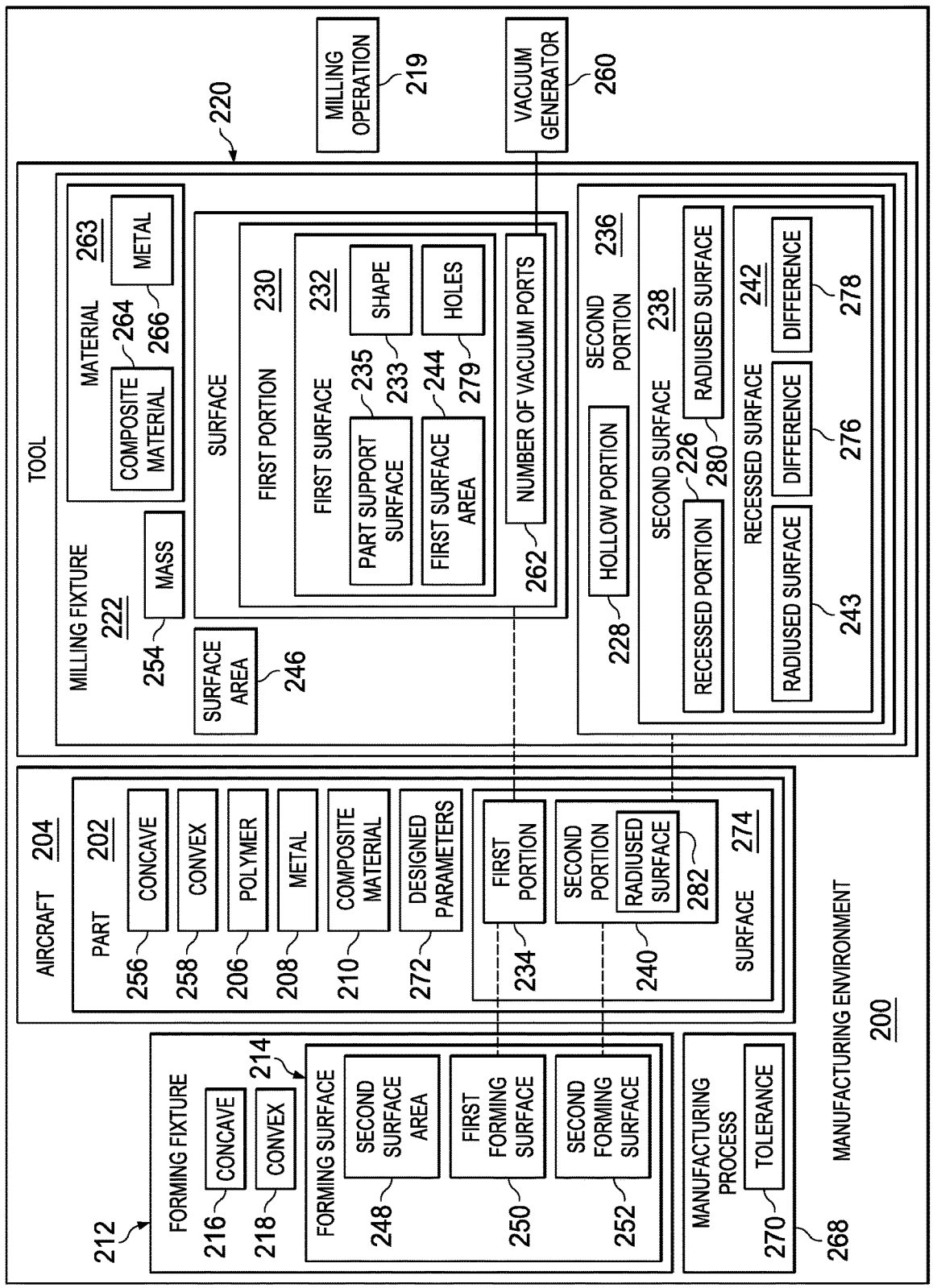
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 may be used to manufacture Part 202. Part 202 may be a part of aircraft 204. Aircraft 100 of FIG. 1 may be a physical implementation of aircraft 204 of FIG. 2.

Part 202 may be made of at least one of polymer 206, metal 208, or composite material 210. Part 202 may be manufactured and then milled. Part 202 may be manufactured using at least one of machining, sintering, molding, bending, printing, laying up, welding, friction stir welding, additive manufacturing, or other desirable manufacturing processes. For example, when part 202 is made of polymer 206, part 202 may be manufactured by molding or printing polymer 206. As another example, when part 202 is made of metal 208, part 202 may be manufactured by machining metal 208. In illustrative examples in which part 202 is made of composite material 210, composite material 210 may be laid up on forming fixture 212. Forming fixture 212 may be configured to form part 202. Forming fixture 212 may have forming surface 214. Forming surface 214 may be used to shape composite material 210 into part 202.

When forming fixture 212 is concave 216, forming fixture 212 may be used to form a substantially convex surface of part 202. As a result, part 202 may have a substantially convex surface complementary to forming surface 214 of forming fixture 212. When forming fixture 212 is convex 218, forming fixture 212 may be used to form a substantially concave surface of part 202. As a result, part 202 may have a substantially concave surface complementary to forming surface 214 of forming fixture 212.

For milling operations such as milling operation 219, part 202 may be supported by tool 220. In some illustrative examples, tool 220 may be milling fixture 222. Tool 220 may have surface 224. Surface 224 may be configured to support part 202 during milling operation 219. Surface 224 may differ from forming surface 214 of forming fixture 212 by at least one of recessed portion 226 or hollow portion 228.

First portion 230 of tool 220 may have first surface 232. First surface 232 may have shape 233 that is complementary to first portion 234 of part 202. In some illustrative examples, first surface 232 may be referred to as part support surface 235. Tool 220 may also have second portion 236. Second portion 236 may have at least one of second surface 238 configured to be recessed from second portion 240 of part 202, or hollow portion 228. In some illustrative examples, second surface 238 may be configured to be recessed from second portion 240 of part 202 and may be referred to as recessed surface 242. In some illustrative examples, recessed surface 242 may be radiused surface 243.

First surface area 244 of milling fixture 222 may be a portion of surface area 246 of milling fixture 222 that contacts part 202 to support part 202 during milling operation 219. In some illustrative examples, first surface area 244 of milling fixture 222 contacting part 202 is less than second surface area 248 of forming fixture 212 contacting part 202.

In some illustrative examples, first surface 232 may be substantially the same as first forming surface 250 of forming fixture 212 configured to form part 202. First forming surface 250 of forming fixture 212 may be used to form first portion 234. First forming surface 250 may be complementary to first portion 234 of part 202. Second surface 238 may differ from second forming surface 252 of forming fixture 212. Second surface 238 may differ from second forming surface 252 of forming fixture 212 by at least one of recessed portion 226 or hollow portion 228. Tool 220 may differ from forming surface 214 of forming fixture 212 by at least one of recessed surface 242 or hollow portion 228.

Although tool 220 has been discussed relative to forming fixture 212, part 202 may be manufactured using any of a number of manufacturing processes. In some illustrative examples, part 202 may not be manufactured using forming fixture 212. For example, part 202 may be manufactured using at least one of bending, machining, printing, sintering, printing, welding, friction stir welding, additive manufacturing, chemical milling, joining, or other desirable manufacturing processes. In these illustrative examples, tool 220 may instead be described relative to part 202.

Surface 224 may be designed to support part 202. Further, surface 224 may be designed such that placing part 202 onto tool 220 may not use an undesirable amount of force. Surface 224 may be designed such that only a fraction of surface 224 contacts part 202. This fraction may be referred to as first surface 232 of first portion 230 of tool 220. First surface area 244 may be an area of tool 220 contacting part 202.

First surface 232 may be designed for desirable placement of part 202 on tool 220. Further, first surface 232 may be designed for desirable quality of part 202 following milling operation 219. First surface 232 may be sufficient to support part 202 without undesirable vibration during milling operation 219. Undesirable vibration may cause out of tolerance conditions or inconsistencies in at least one of part 202 or tool 220. Tool 220 may be designed such that support of part 202 by second surface 238 is not required for milling operation 219. Second surface 238 may not be required to contact part 202 to reduce or eliminate vibration during milling operation 219.

Second portion 236 of tool 220 may not contact part 202. Second portion 236 of tool 220 may not contact part 202 because recessed surface 242 may be recessed from second portion 240 of part 202. In some illustrative examples, second portion 236 of tool 220 may not contact part 202 because hollow portion 228 may be present in second portion 236. Hollow portion 228 may be a section of tool 220 in which there is not material. In some illustrative examples, hollow portion 228 may be cutout within surface 224 of tool 220.

It may be desirable to not only maintain the quality of part 202 by reducing or preventing inconsistencies, but it may also be desirable to maintain the structural stability of milling fixture 222. Surface area 246 may be sufficient to maintain structural stability of milling fixture 222. Further, mass 254 of milling fixture 222 may be sufficient to maintain structural stability of milling fixture 222.

When part 202 is concave 256 or convex 258, tolerance stack up or variances in manufacturing of part 202 may make fitting part 202 to a conventional milling fixture more difficult than desired. However, by having second portion 236, tolerance stack up or variances in second portion 240 of part 202 may not influence fitting part 202 onto tool 220. Second portion 236 may reduce at least one of time or force to fit part 202 to tool 220.

After placing part 202 onto tool 220, part 202 may be held onto tool 220 by drawing a vacuum on first portion 234 of part 202. Vacuum generator 260 may apply a vacuum to number of vacuum ports 262 to hold first portion 234 of part 202 against first surface 232 of tool 220. Number of vacuum ports 262 may be disposed within first surface 232 of tool 220.

Part 202 may not contact second portion 236. As a result, second portion 236 may not be associated with any vacuum ports.

By reducing the amount of surface 224 contacting part 202, at least one of the time, force, or number of operators to fit part 202 to tool 220 may be reduced. Further, by reducing the amount of surface 224 contacting part 202, at least one of the manufacturing time or inspection time for manufacturing tool 220 may be reduced. For example, by reducing the amount of surface 224 contacting part 202, the amount of surface 224 having tight tolerance machining and inspection steps may be reduced.

Tool 220 is formed of material 263. In some illustrative examples, tool 220 may be formed of at least one of composite material 264, metal 266, or other desirable material. When tool 220 is formed of metal 266, first surface 232 and second surface 238 may be manufactured by machining metal 266. When tool 220 is formed of composite material 264, first surface 232 and second surface 238 may be formed by laying up composite material 264 on forming fixture 212, curing composite material 264, and machining composite material 264.

As described above, second portion 236 of tool 220 may not contact part 202 because recessed surface 242 may be recessed from second portion 240 of part 202. Part 202 may be formed using manufacturing process 268. Manufacturing process 268 may have tolerance 270. Due to tolerance 270, part 202 may have an acceptable variation in size, shape, or other characteristics.

Part 202 may have designed parameters 272. Surface 274 of part 202 may vary from designed parameters 272 due to tolerance 270. In some illustrative examples, the combination of tolerance 270 and designed parameters 272 may describe the maximum growth of part 202. It may be desirable for second surface 238 to not contact part 202.

Second surface 238 may be recessed taking tolerance 270 into account. In some illustrative examples, second surface 238 may be recessed greater than the maximum growth of part 202. By having a greater recess than the maximum growth of part 202, second surface 238 may not contact part 202 even if second portion 240 has full tolerance 270.

In some illustrative examples, second surface 238 is recessed from designed parameters 272 of part 202 a value greater than the value of tolerance 270 for manufacturing process 268 utilized to manufacture part 202. In these illustrative examples, difference 276 between second surface 238 and second portion 240 may be greater than zero. By difference 276 between second surface 238 and second portion 240 being greater than zero, second surface 238 may not contact second portion 240.

In some illustrative examples, difference 278 between second surface 238 and second forming surface 252 is greater than tolerance 270. When difference 278 is greater than tolerance 270, second surface 238 may not contact second portion 240 of part 202. When second surface 238 does not contact second portion 240 of part 202, seating part 202 on milling fixture 222 may require at least one of less force, less time, or fewer operators.

In some illustrative examples, milling operation 219 may be performed on first portion 234 of part 202. When milling operation 219 is a drilling operation, milling operation 219 may be performed through holes 279 in first surface 232. First surface 232 may be positioned relative to first portion 234 of part 202 that will receive milling operation 219.

Second portion 240 may not receive milling operation 219. In some illustrative examples, second surface 238 may be desirably placed relative to second portion 240 when second portion 240 does not receive milling operation 219.

In some illustrative examples, second surface 238 may be located relative to portions of part 202 that may have the greatest expected variation. For example, second surface 238 may be radiused surface 280. When second surface 238 is radiused surface 280, second portion 240 may be radiused surface 282. Radiused surface 282 may vary from designed parameters 272 more frequently or a greater amount than first portion 234 varies from designed parameters 272.

Figure 3:
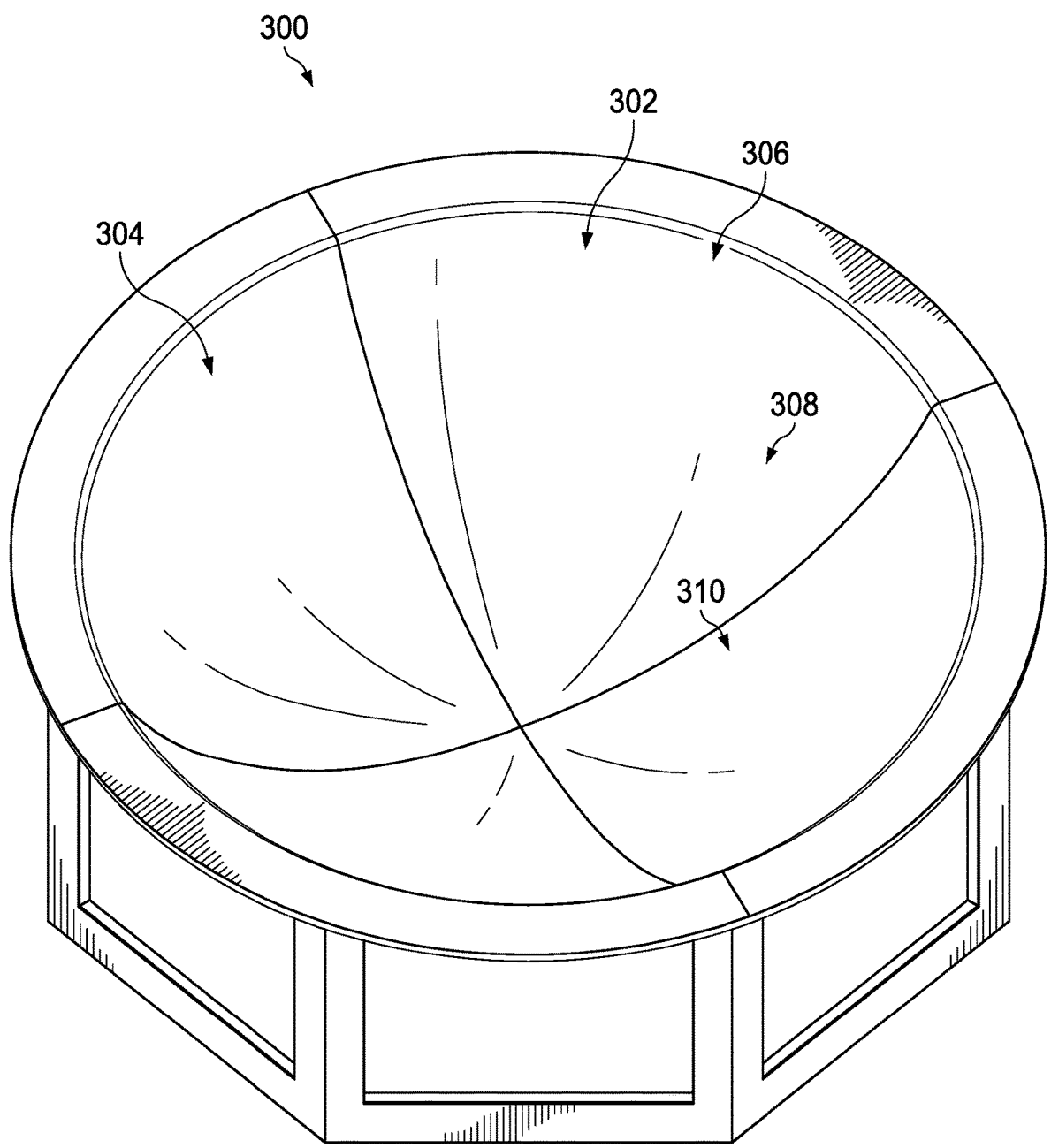
FIG. 3 is an illustration of an isometric view of a forming fixture in accordance with an illustrative embodiment.

Turning now to FIG. 3, an illustration of an isometric view of a forming fixture is depicted in accordance with an illustrative embodiment. Forming fixture 300 may be a physical implementation of forming fixture 212 of FIG. 2. Forming fixture 300 may be substantially concave 302. Forming fixture 300 may act as an outer mold line when forming a part. In this illustrative example, forming fixture 300 has forming surface 304. Forming surface 304 includes first forming surface 306 and second forming surface 308. Forming surface 304 has surface area 310. Surface area 310 may be the value of the area of forming surface 304 contacting a part during forming.

Figure 4:
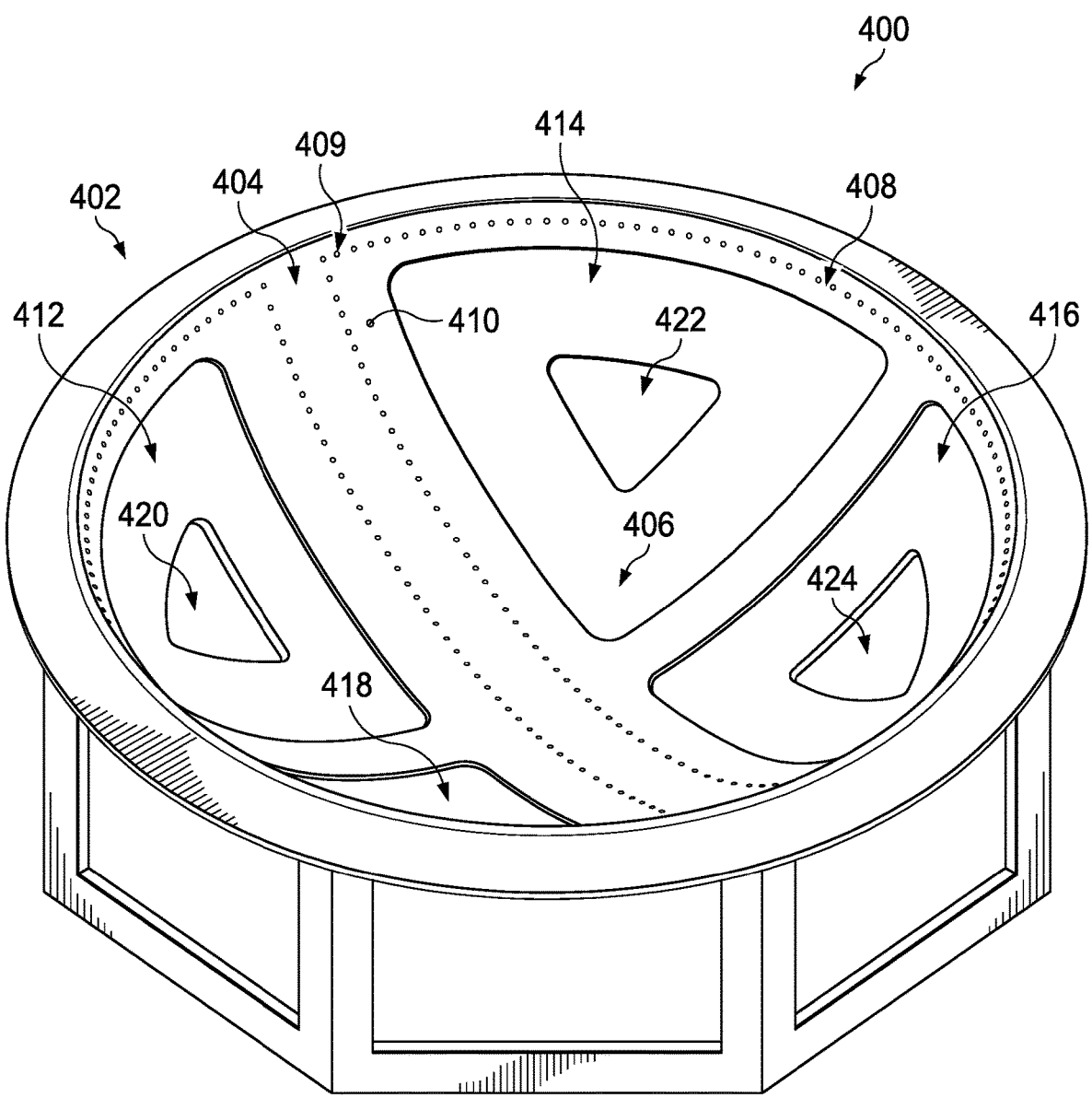
FIG. 4 is an illustration of an isometric view of a milling fixture in accordance with an illustrative embodiment.

Turning now to FIG. 4, an illustration of an isometric view of a milling fixture is depicted in accordance with an illustrative embodiment. Milling fixture 400 may be a physical implementation of milling fixture 222 of FIG. 2. In some illustrative examples, milling fixture 400 may support a part formed using forming fixture 300 during a milling operation such as milling operation 219 of FIG. 2. In some illustrative examples, milling fixture 400 may support a part manufactured using any desirable manufacturing process during a milling operation.

Milling fixture 400 has surface 402. Surface 402 may be configured to support a part during a milling operation. Surface 402 has first portion 404 and second portion 406. First portion 404 includes first surface 408 that may be configured to contact a portion of a part during a milling operation. First surface 408 has holes 409 through which a milling operation such as milling operation 219 of FIG. 2 may be performed. For example, a drill bit (not depicted) may go at least partway through holes 409 to perform a milling operation. First portion 404 may be associated with number of vacuum ports 410. Number of vacuum ports 410 is disposed within first surface 408. Number of vacuum ports 410 may apply a vacuum to hold a portion of the part against first surface 408 of milling fixture 400. In this illustrative example, number of vacuum ports 410 is a single vacuum port. However, in other illustrative examples, number of vacuum ports 410 may be more than one vacuum port. Number of vacuum ports 410 may include any desirable number of vacuum ports for milling fixture 400. A desirable number of vacuum ports may be determined based on at least one of locations of number of vacuum ports 410, size of first portion 404, shape of first portion 404, size of second portion 406, shape of second portion 406, location of second portion 406 relative to first portion 404, or other considerations.

In this illustrative example, second portion 406 includes recessed portion 412, recessed portion 414, recessed portion 416, recessed portion 418, hollow portion 420, hollow portion 422, and hollow portion 424. Recessed portion 412, recessed portion 414, recessed portion 416, and recessed portion 418 are configured to be recessed from a second portion of a part to be positioned on milling fixture 400. In some illustrative examples, recessed portion 412, recessed portion 414, recessed portion 416, and recessed portion 418 may each be recessed from the part substantially the same distance. In some illustrative examples, at least one of recessed portion 412, recessed portion 414, recessed portion 416, or recessed portion 418 may be recessed from the part a different value than the other recessed portions. In some illustrative examples, at least one of recessed portion 412, recessed portion 414, recessed portion 416, or recessed portion 418 may be recessed a value greater than the maximum growth of the part. In some illustrative examples, at least one of recessed portion 412, recessed portion 414, recessed portion 416, or recessed portion 418 may be recessed from the part a value greater than a tolerance value for a manufacturing process utilized to manufacture the part.

First surface 408 of milling fixture 400 may be substantially the same as first forming surface 306 of forming fixture 300 of FIG. 3. Second portion 406 of milling fixture 400 may differ from second forming surface 308 of forming fixture 300 of FIG. 3 as a result of recessed portion 412, recessed portion 414, recessed portion 416, recessed portion 418, hollow portion 420, hollow portion 422, and hollow portion 424. Second portion 406 of milling fixture 400 does not contact the part during a milling operation.

Other components may be present in milling fixture 400 which are not depicted herein. For example, when milling fixture 400 includes number of vacuum ports 410, milling fixture 400 may also include a number of rubber seals. The number of rubber seals may create barriers for containing the vacuum. As another example, when milling fixture 400 includes number of vacuum ports 410, milling fixture 400 may also include vacuum grooves to improve air flow between milling fixture 400 and a part (not depicted). A number of vacuum grooves or passages may act as guides or supply vessels for the vacuum under the part.

In other illustrative examples, milling fixture 400 may not be associated with a vacuum generator. In these illustrative examples, milling fixture 400 may not have number of vacuum ports 410. In these illustrative examples, vacuum may not be used to maintain a position of a part on milling fixture 400. In these illustrative examples, an alternative method of maintaining the position of a part on milling fixture 400 may be used. An alternate method of maintaining the position of a part on milling fixture 400 may include at least one of bolts, screws, clamps, double back tape, adhesives, or any other desirable components for retaining the position of part. For example, clamps (not depicted) may be used to maintain a position of a part on milling fixture 400. In this illustrative example, the part (not depicted) may be clamped after the part (not depicted) is seated on milling fixture 400.

Figure 5:
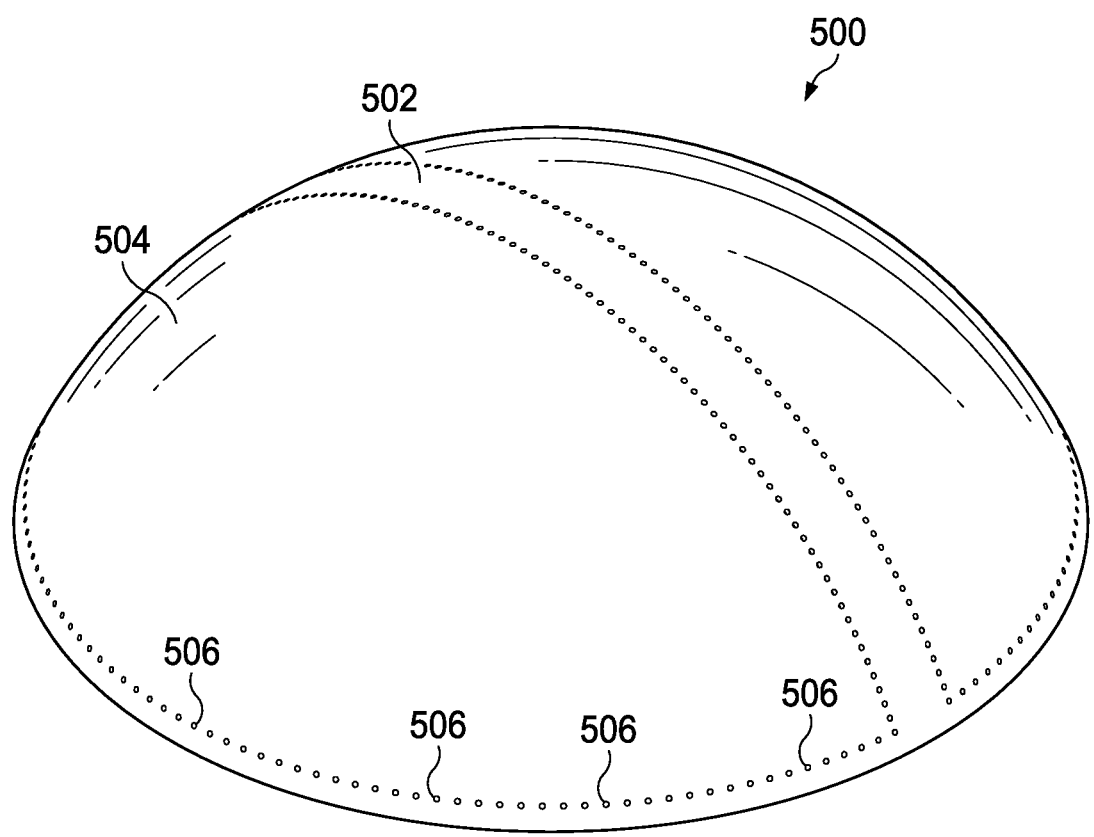
FIG. 5 is an illustration of an isometric view of a part created using the forming fixture and the milling fixture in accordance with an illustrative embodiment.

Turning now to FIG. 5, an illustration of an isometric view of a part created using the forming fixture and the milling fixture is depicted in accordance with an illustrative embodiment. Part 500 may be a physical implementation of part 202 of FIG. 2. Part 500 may be formed using forming fixture 300 of FIG. 3 and may be milled while on milling fixture 400 of FIG. 4.

Part 500 has first portion 502 and second portion 504. First portion 502 may contact first surface 408 of milling fixture 400 of FIG. 4 during a milling operation. Second portion 504 may not contact milling fixture 400 during a milling operation. Holes 506 within first portion 502 may be examples of features formed during a milling operation. Holes 506 may be formed by drilling through first portion 404 of milling fixture 400 of FIG. 4. Accordingly, holes 506 may substantially match locations of holes 409 of milling fixture 400 of FIG. 4. Holes 506 may extend across the dome and around the perimeter of part 500.

Figure 6:
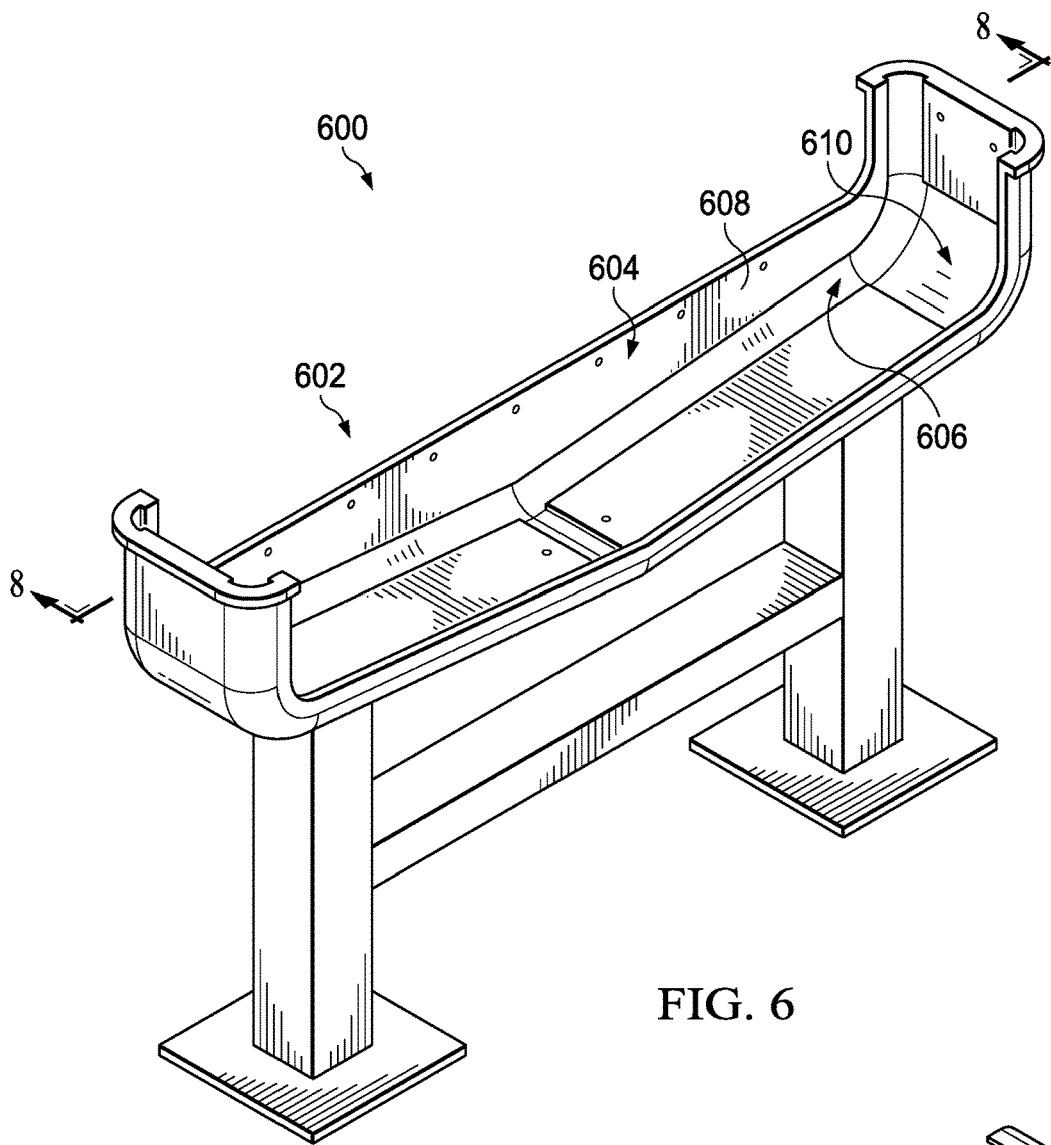
FIG. 6 is an illustration of an isometric view of a milling fixture in accordance with an illustrative embodiment.

Turning now to FIG. 6, an illustration of an isometric view of a milling fixture is depicted in accordance with an illustrative embodiment. Milling fixture 600 may be a physical implementation of milling fixture 222 of FIG. 2. Milling fixture 600 may be used to perform a milling operation on a part, such as a car bumper.

Milling fixture 600 has surface 602 including first portion 604 and second portion 606. First portion 604 includes first surface 608. First surface 608 may contact a portion of a part (not depicted) during a milling operation such as milling operation 219 of FIG. 2. Second portion 606 may include recessed portion 610. Although second portion 606 is depicted as only including one recessed portion, second portion 606 may include any desirable number of recessed portions. For example, second portion 606 may include at least one hollow portion and no recessed portions. In some illustrative examples, second portion 606 may include more than one recessed portion. In some illustrative examples, rather than recessed portion 610 being continuous, the area covered by recessed portion 610 may be subdivided into separate recessed portions.

Second portion 606 may not contact the part during a milling operation. Recessed portions such as recessed portion 610 may be desirably located in rounded or radiused areas of milling fixture 600. Substantially planar areas may be desirably within first portion 604 of milling fixture 600. Rounded or radiused areas of parts may be more likely to include out of tolerance conditions such as out of tolerance shape, thickness, or other characteristics. Rounded or radiused areas of parts may be more likely to vary from designed parameters of the part. Substantially planar areas of parts may be less likely to include out of tolerance characteristics.

In some illustrative examples, recessed portion 610 may be recessed from the part substantially the same distance throughout recessed portion 610. In some illustrative examples, at least one area of recessed portion 610 may be recessed from the part a different value than another area of recessed portion 610. For example, the depth of recessed portion 610 may vary over the length of recessed portion 610. In some illustrative examples, recessed portion 610 may be recessed a value greater than the maximum growth of the part. In some illustrative examples, recessed portion 610 may be recessed from the part a value greater than a tolerance value for a manufacturing process utilized to manufacture the part.

First portion 604 may be associated with a number of vacuum ports (not depicted). The number of vacuum ports (not depicted) may be disposed in first surface 608. A vacuum may be drawn through the number of vacuum ports (not depicted) to hold a portion of the part against first portion 604 of milling fixture 600. Second portion 606 may not be associated with any vacuum ports.

Figure 7:
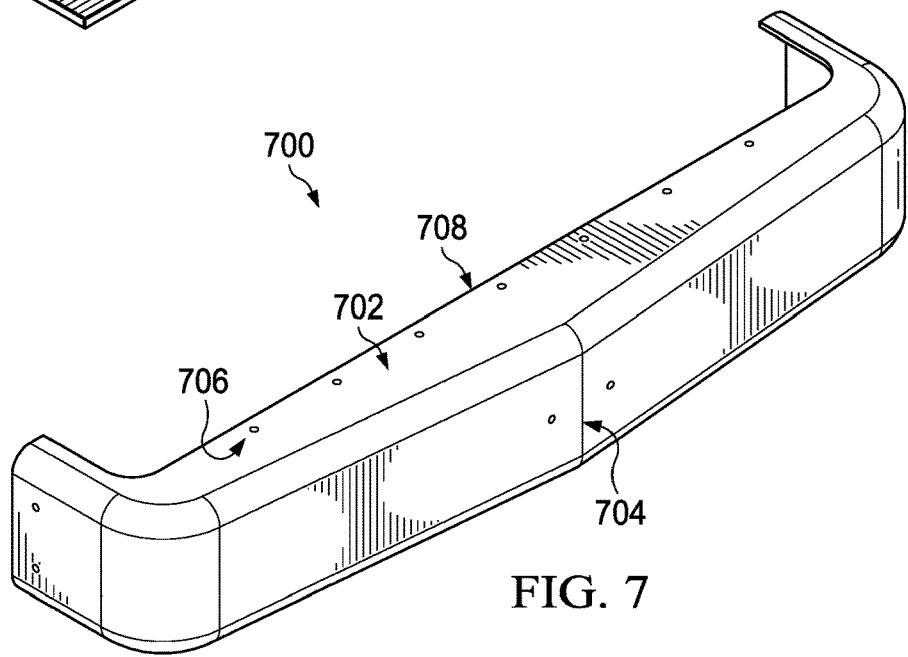
FIG. 7 is an illustration of an isometric view of a part created using the forming fixture and the milling fixture in accordance with an illustrative embodiment.

Turning now to FIG. 7, an illustration of an isometric view of a part created using the forming fixture and the milling fixture is depicted in accordance with an illustrative embodiment. Part 700 may be a physical implementation of part 202 of FIG. 2. Part 700 may be milled while on milling fixture 600 of FIG. 6. In some illustrative examples, part 700 may be a composite material. In these illustrative examples, part 700 may be formed on a forming tool (not depicted). In some illustrative examples, part 700 may be a metal. In these illustrative examples, part 700 may be manufactured by at least one of bending or machining.

Part 700 may have first portion 702 and second portion 704. First portion 702 may be in contact with first portion 604 of milling fixture 600 of FIG. 6 during a milling operation. Second portion 704 may not be in contact with milling fixture 600 during a milling operation.

Surface 602 of milling fixture 600 may be designed such that part 700 may be sufficiently supported during a milling operation. For example, surface 602 of milling fixture 600 may be designed such that first surface 608 may be sufficient to support part 700 without undesirable vibration during a milling operation. Surface 602 of milling fixture 600 may be designed such that support of second portion 704 by second portion 606 is not required for a milling operation.

Holes 706 within first portion 702 may be examples of features formed during a milling operation. Holes 706 may be formed by drilling through first portion 604 of milling fixture 600 of FIG. 6. Another illustrative example of a milling operation may be a trimming operation. For example, edge 708 of part 700 may be trimmed while part 700 is on milling fixture 600. In some illustrative examples, other milling operations may be performed on part 700 while part 700 is on milling fixture 600.

Figure 8:
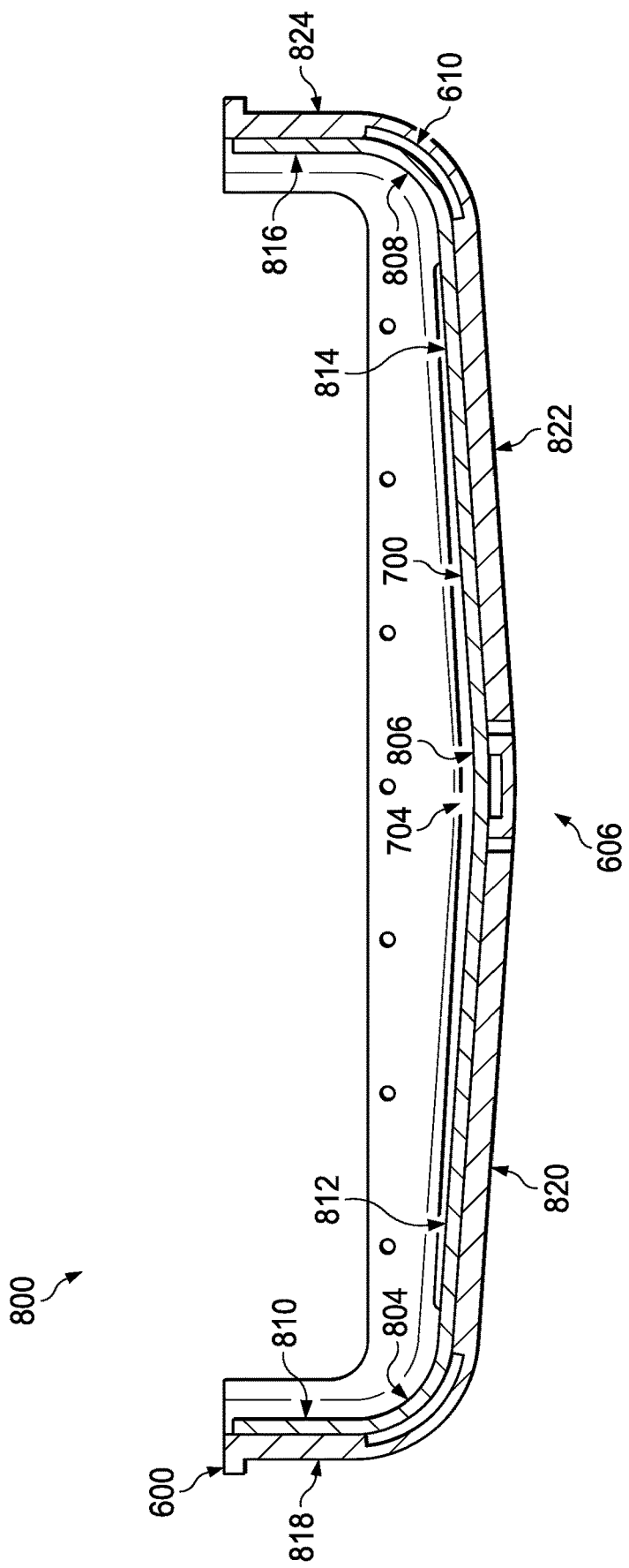
FIG. 8 is an illustration of a front cross-sectional view of a part in the milling fixture in accordance with an illustrative embodiment.

Turning now to FIG. 8, an illustration of a front cross-sectional view of a part in the milling fixture is depicted in accordance with an illustrative embodiment. View 800 may be a front cross-sectional view of part 700 within milling fixture 600 seen in direction of lines 8-8 in FIG. 6.

As depicted, milling fixture 600 has recessed portion 610. Second portion 606 may include recessed portion 610. As depicted, recessed portion 610 does not contact part 700.

Second portion 704 of part 700 does not contact milling fixture 600. Second portion 704 may include at least one of radiused portion 804, radiused portion 806, or radiused portion 808. For example, radiused portion 804 does not contact recessed portion 610. In some illustrative examples, second portion 704 may include radiused portion 804. Radiused portion 806 does not contact recessed portion 610. In some illustrative examples, second portion 704 may include radiused portion 806. Radiused portion 808 does not contact recessed portion 610. In some illustrative examples, second portion 704 may include radiused portion 808.

In this illustrative example, first portion 702 of part 700 contacts first portion 604 of milling fixture 600. First portion 702 may include at least one of section 810, section 812, section 814, or section 816. First portion 604 of milling fixture 600 may include at least one of section 818, section 820, section 822, or section 824. Section 810 may contact section 818 of milling fixture 600. Section 812 may contact section 820 of milling fixture 600. Section 814 may contact section 822 of milling fixture 600. Section 816 may contact section 824 of milling fixture 600.

The diagrammatic representation of aircraft 100 in FIG. 1, manufacturing environment 200 in FIG. 2, forming fixture 300 in FIG. 3, milling fixtures in FIGS. 4, 6, and 8, and parts in FIGS. 5, 7, and 8 are not meant to imply physical or architectural limitations to the manner in which an illustrative embodiment may be implemented. Other components in addition to or in place of the ones illustrated may be used. Some components may be unnecessary. Also, the blocks of FIG. 2 are presented to illustrate some functional components. One or more of these blocks may be combined, divided, or combined and divided into different blocks when implemented in an illustrative embodiment.

For example, second portion 236 may include more than one recessed portion. As another example, second portion 236 may include more than one hollow portion. In yet another example, hollow portion 228 may not be present.

Figure 9:
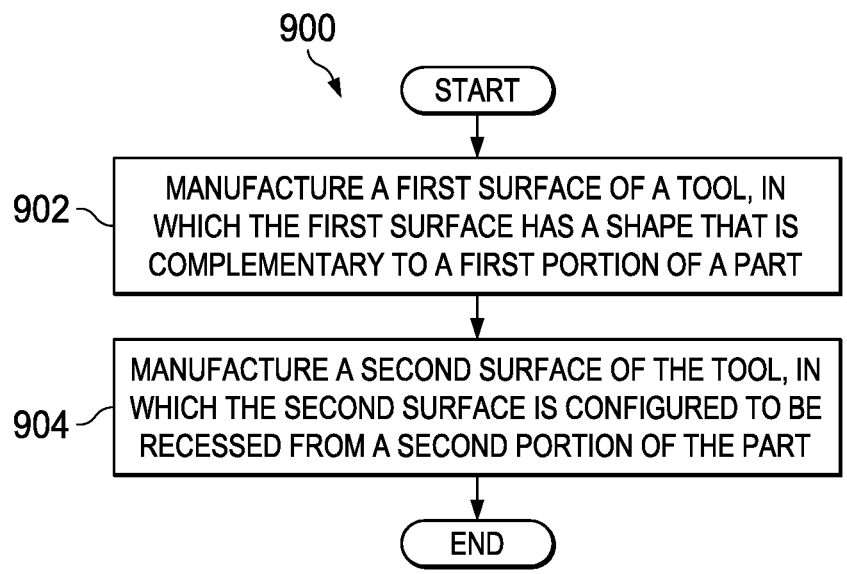
FIG. 9 is an illustration of a flowchart of a process for creating a milling fixture in accordance with an illustrative embodiment.

Turning now to FIG. 9, an illustration of a flowchart of a process for creating a milling fixture is depicted in accordance with an illustrative embodiment. Process 900 may be used to form milling fixture 222 of FIG. 2.

Process 900 may begin by manufacturing a first surface of a tool, in which the first surface has a shape that is complementary to a first portion of a part (operation 902). In some illustrative examples, manufacturing the first surface of the tool may be done by at least one of machining, laying up a material, printing, or other desirable manufacturing processes. For example, in some illustrative examples, manufacturing the first surface includes laying up a composite material.

Process 900 may then manufacture a second surface of the tool, in which the second surface is configured to be recessed from a second portion of the part (operation 904). In some illustrative examples, the second surface of the tool is a radiused surface of the tool. In some illustrative examples, the second portion of the part does not receive a milling operation. Afterwards the process may terminate.

In some illustrative examples, manufacturing the second surface of the tool may be done by at least one of machining, laying up a material, printing, or other desirable manufacturing process. In other illustrative examples, manufacturing the first surface and manufacturing the second surface comprises laying up a composite material. In some illustrative examples, manufacturing the first surface and manufacturing the second surface comprises machining a material. In some illustrative examples, the material may be a metal. In some other illustrative examples, the material may be a composite material.

In some illustrative examples, manufacturing the second surface of the tool may include removing a portion of the second surface to form a hollow portion. In some illustrative examples, manufacturing the first surface may occur after manufacturing the second surface. For example, the first surface may be formed through additive manufacturing. The first surface may be additively created onto a base having the second surface. In some illustrative examples, manufacturing the second surface of the tool may include forming a hollow portion by not laying up material in the hollow portion.

Figure 10:
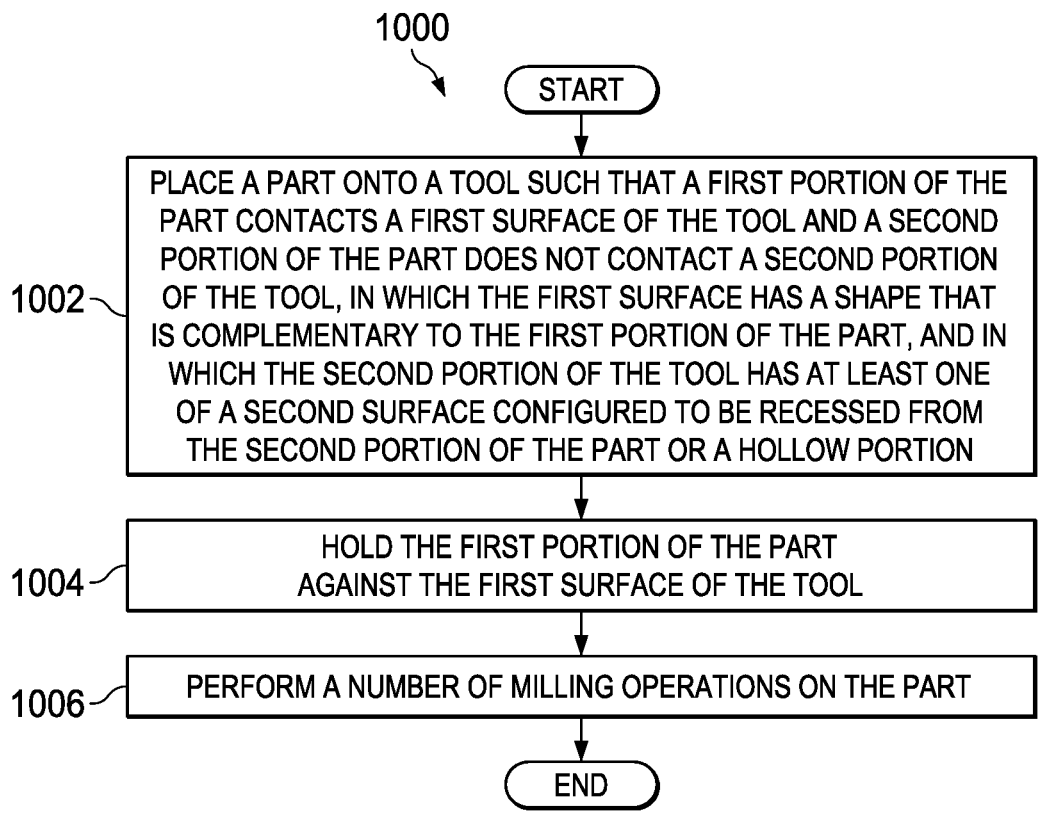
FIG. 10 is an illustration of a flowchart of a process for performing a milling operation in accordance with an illustrative embodiment.

Turning now to FIG. 10, an illustration of a flowchart of a process for performing a milling operation is depicted in accordance with an illustrative embodiment. Process 1000 may be used to perform a milling operation on part 202 of FIG. 2.

Process 1000 may begin by placing a part onto a tool such that a first portion of the part contacts a first surface of the tool and a second portion of the part does not contact a second portion of the tool, in which the first surface has a shape that is complementary to the first portion of the part, and in which the second portion of the tool has at least one of a second surface configured to be recessed from the second portion of the part or a hollow portion (operation 1002). The part may be fitted to the tool using a desirable amount of force. By only contacting the first surface of the tool, the time to fit the part to the tool may be less than if the entirety of the part were to contact the milling fixture.

Process 1000 may also hold the first portion of the part against the first surface of the tool (operation 1004). Holding the first portion of the part against the first surface of the tool may be performed by drawing a vacuum through a number of vacuum ports, clamping using a number of clamps, or any other desirable method of holding the first portion of the part against the first surface of the tool.

Process 1000 may also perform a number of milling operations on the part (operation 1006). In some illustrative examples, the number of milling operations may include at least one of trimming or drilling. Afterwards, the process may terminate.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the Figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Further, some blocks may not be implemented.

Figure 12:
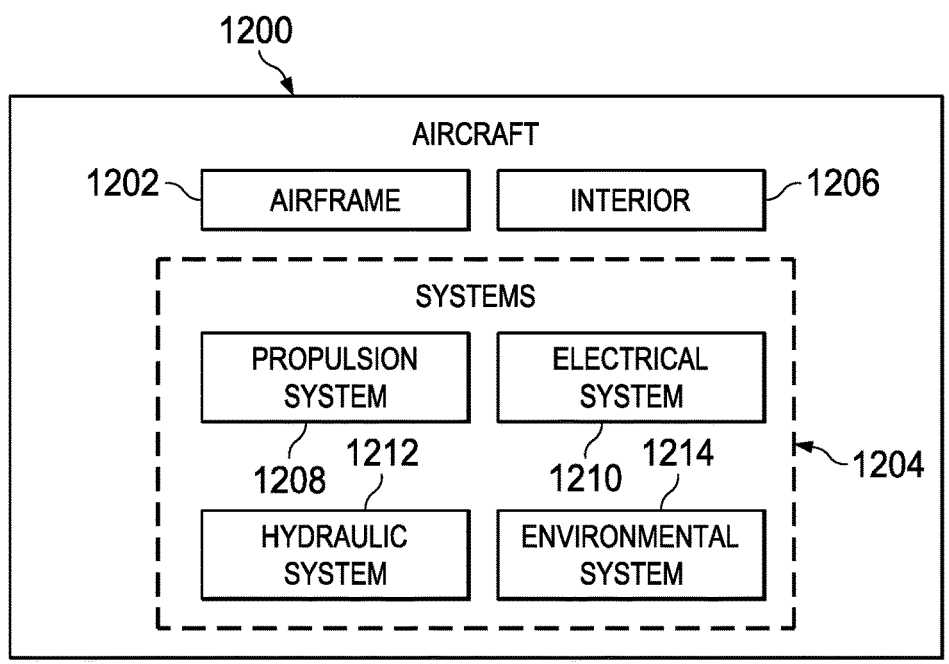
FIG. 12 is an illustration of a block diagram of an aircraft in which an illustrative embodiment may be implemented.

Illustrative embodiments of the disclosure may be described in the context of aircraft manufacturing and service method 1100 as shown in FIG. 11 and aircraft 1200 as shown in FIG. 12. Turning first to FIG. 11, an illustration of an aircraft manufacturing and service method is depicted in accordance with an illustrative embodiment. During pre-production, aircraft manufacturing and service method 1100 may include specification and design 1102 of aircraft 1200 of FIG. 12 and material procurement 1104.

During production, component and subassembly manufacturing 1106 and system integration 1108 of aircraft 1200 of FIG. 12 takes place. Thereafter, aircraft 1200 of FIG. 12 may go through certification and delivery 1110 in order to be placed in service 1112. While in service 1112 by a customer, aircraft 1200 of FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in which an illustrative embodiment may be implemented. In this example, aircraft 1200 is produced by aircraft manufacturing and service method 1100 of FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1100 of FIG. 11. One or more illustrative embodiments may be used during component and subassembly manufacturing 1106. For example, milling fixture 222 of FIG. 2 may be used during component and subassembly manufacturing 1106. Further, part 202 of FIG. 2 may also be used to perform replacements during maintenance and service 1114. For example, aircraft 1200 may be inspected during scheduled maintenance for aircraft 1200 and part 202 may be used to replace a part. Milling fixture 222 of FIG. 2 may be used to secure any desirable types of parts, such as components of airframe 1202 or interior 1206.

The illustrative embodiments present a milling fixture having a reduced surface area contacting a part. By not requiring all of the surface area of the milling fixture to contact a part during a milling operation, it may require at least one of less force, less time, or fewer operators to fit the part to the milling fixture.

Parts with large surface areas may be more difficult than desirable to fit and secure in conventional milling fixtures. Concave or convex part shapes may be difficult to fit on conventional tools due to at least one of tolerance stack up or variances in manufacturing. Conventional milling fixtures that are convex or concave with large surface areas may require complex methods to restrain a part to contour. Parts may be scrapped because of inconsistencies caused by improper seating on a conventional milling fixture.

A reduced surface area contacting a part may allow the part to more easily fit in a milling fixture. A reduced surface area contacting a part may enable easier attainment of vacuum hold. Yet further, the cost of the milling fixture fabrication may be reduced. For example, the cost of fabrication of the milling fixture may be reduced by lessening the amount of manufacturing and inspection time to fabricate the tool. Areas of the milling fixture not requiring contact with the part may either be removed, or the recessed areas may be given a larger tolerance value. With a larger tolerance value, the recessed areas may require less machining time. Further, with a larger tolerance value, the recessed areas may not require precision inspection. A further cost savings may occur by eliminating re-machining of a tool in the recessed areas to get a part to fit. A reduced surface contact area may reduce or prevent downtime while the tool is being re-machined. Further, a reduced surface contact area may reduce or prevent delays as re-machining a tool may delay part delivery.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of creating a milling fixture, the method comprising:
   manufacturing a first surface of a tool, such that the first surface comprises a first perimeter and a shape formed complementary to a first portion of a part for a milling operation on the part when the part is located within the milling fixture; and
   manufacturing a second surface of the tool, such that the second surface comprises a second perimeter that lies within the first perimeter and recesses away from the first surface and from a second portion of the part with the first portion of the part contacting the first surface of the tool and the second portion of the part is facing and not contacting the second surface of the tool,
   wherein manufacturing the first surface and manufacturing the second surface comprises laying up a composite material and
   wherein the first surface of the tool comprises a number of through-holes for performing the milling operation on a side of the part facing and contacting the first surface of the milling fixture.

2. The method of claim 1, wherein manufacturing the first surface and manufacturing the second surface comprises machining a material.

3. The method of claim 1, wherein the second surface of the tool comprises a radiused surface of the tool.

4. The method of claim 1, wherein the second surface of the tool lies within a perimeter of the first surface of the tool.

5. The method of claim 1, wherein the second surface of the tool comprises a hollow portion.

6. The method of claim 1, wherein the second surface of the tool comprises a perimeter that lies within a perimeter of the first surface.

7. The method of claim 1, wherein the second surface of the tool comprises a hollow portion and a perimeter that lies within a perimeter of the first surface.

8. A method of creating a milling fixture, the method comprising:
   manufacturing a first surface of the milling fixture comprising a female shape for contacting with and complementary to a first portion of a part, the first surface of the milling fixture comprising:
      through-holes for milling on a side of the part contacting the first surface of the milling fixture; and
      a vacuum port for holding the first portion of the part in contact with the first surface of the milling fixture; and
   manufacturing a second surface of the milling fixture by recessing the second surface of the milling fixture from the first surface of the milling fixture, a second portion of the part facing and spaced from the second surface of the milling fixture when the part is located within the milling fixture for milling, the second surface of the milling fixture comprising a second perimeter lying within a first perimeter of the first surface of the milling fixture.

9. The method of claim 8, wherein manufacturing the first surface and manufacturing the second surface comprises laying up a composite material.

10. The method of claim 8, wherein manufacturing the first surface and manufacturing the second surface comprises machining a material.

11. The method of claim 8, wherein the second surface of the milling fixture comprises a radiused surface.

12. The method of claim 8, wherein the second surface comprises a hollow portion.

13. The method of claim 8, wherein the first surface comprises an outer ring devoid of through-holes.

14. A method of performing a milling operation, the method comprising:

placing a part onto a tool such that a first portion of the part contacts a first surface of the tool and a second portion of the part remains recessed from a second portion of the tool, such that the first surface comprises a first perimeter and a shape complementary to the first portion of the part, and the second portion of the tool comprises a second perimeter that lies within the first perimeter and a second surface configured to be recessed from and not contacting the second portion of the part when the part is located within the tool;

holding the first portion of the part against the first surface of the tool;

performing a number of milling operations on the part; and performing the number of milling operations on a side of the part facing the tool.

15. The method of claim 14, wherein the second surface of the tool comprises a perimeter within a perimeter of the first surface.

16. The method of claim 14, wherein the second surface comprises a hollow portion and a perimeter within a perimeter of the first surface of the tool.

17. The method of claim 14, further comprising:

performing, through through-holes in the first surface, the number of milling operations on a side of the part facing the tool.

\* \* \* \* \*